June 13, 1933. G. BRIGGS 1,913,870
ADVERTISING AND LIKE DEVICE
Filed July 24, 1931. 4 Sheets-Sheet 1

George Briggs
INVENTOR
his ATTORNEY.

June 13, 1933.   G. BRIGGS   1,913,870
ADVERTISING AND LIKE DEVICE
Filed July 24, 1931   4 Sheets-Sheet 3

George Briggs
INVENTOR
By
his ATTORNEY.

June 13, 1933.　　　G. BRIGGS　　　1,913,870
ADVERTISING AND LIKE DEVICE
Filed July 24, 1931　　4 Sheets-Sheet 4

George Briggs
INVENTOR
By  his ATTORNEY

Patented June 13, 1933

1,913,870

UNITED STATES PATENT OFFICE

GEORGE BRIGGS, OF MAIDA VALE, LONDON, ENGLAND, ASSIGNOR OF ONE-HALF TO VALENTINE SMITH, OF LONDON, ENGLAND

ADVERTISING AND LIKE DEVICE

Application filed July 24, 1931, Serial No. 552,859, and in Great Britain July 30, 1930.

This invention relates to improvements in advertising and like devices, and has for its chief object to provide an attractive and novel advertising device. The device, according to the present invention, in addition to its value as an attractive advertising device as such will also have the advantage that the correct time is shown by the same, the time and the advertisement conveniently being co-related so as to connect the advertisement with the time, the displayed advertisement, for example, advertising some article, device, or commodity which will have particular use or application at the time at which it is shown.

The apparatus, according to the present invention, is characterized in that the advertisement, picture, legend or the like, and the time indication, are displayed together by the device, the advertisement, picture, legend or the like and the time indication being carried by the same medium, and means being provided for controlling the movement of said medium from clockwork mechanism so that the same shall be moved to display a fresh advertisement and time indication at every given period of time.

The medium carrying the advertisement or the like, and the time indication, may comprise lantern slides, a travelling band of paper, cloth or the like or a stencil which operates electrical contacts, but preferably comprises a film, the picture spaces of which contain the advertisements or the like and the time indication.

The apparatus, according to the present invention, utilizing a film, comprises a suitable projector being arranged to project the image upon a convenient screen and is characterized in that an indication of the time is carried on the same film as the advertisement, means being provided to control the movement of the film carrying the advertisements and the time indications in the required manner.

The means for controlling the movement of the film preferably comprise clock mechanism, electrically or mechanically operated, which clock mechanism is employed to make and break an electric circuit to cause the film to be moved step by step. The making and breaking of the electric circuit may cause either a motor or a solenoid to be energized as hereinafter described to operate the projector.

The mechanism is adjusted to change the film, and hence the advertisement and time shown, every half minute, and, in addition to this change, I may in certain apparatus provide means for indicating the seconds of time one by one as they pass. This seconds-indication may be combined with flashing differently coloured lamps, in order to enhance the advertising value and may be projected on to the same screen as the advertisement and time indication or on to a separate screen as desired.

It must be emphasized that the clock mechanism, according to the present invention, which may be spring, pendulum or otherwise operated, plays no part in the time indication except that of controlling the step-by-step movement of the film. No image of the hands of the clock is projected on to the screen, since the required time indication, which may be in the form of a clock or words or figures indicating the time, is actually on the film itself.

In order that this invention may be the more clearly understood and readily carried into effect, I will proceed to describe the same with reference to the accompanying drawings which illustrate by way of example and not of limitation one convenient embodiment of this invention and in which.

Figure 1:
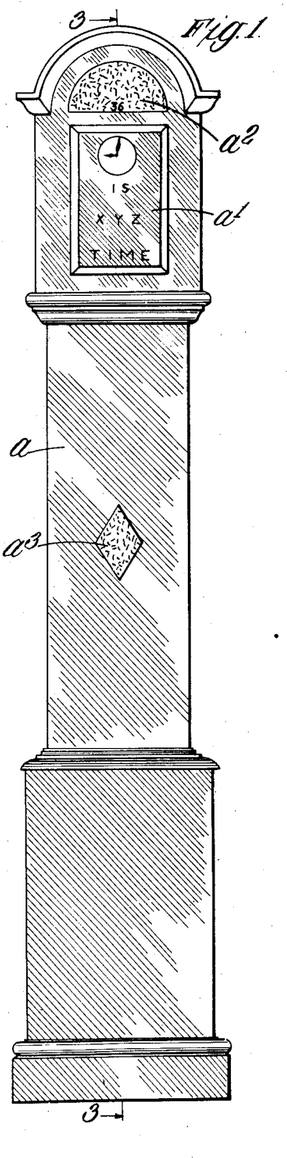
Figure 1 is a front elevation of the advertising and time indication device according to the present invention, embodied in a casing of the shape of a conventional grandfather clock.

Referring now to the drawings, the device therein illustrated comprises a casing $a$ which I prefer to make of the shape normally associated with a clock,—as shown, as grandfather clock—since attention is thereby more readily attracted to the device. Said casing $a$ is provided with a main translucent screen $a^1$ in the position normally occupied by the clock face. This screen $a^1$ is utilized for the exhibition of the advertisement and the time indication. Above this main translucent screen $a^1$ is a further screen $a^2$ which is utilized for the seconds-indication, while a window $a^3$ may be provided in the front of the casing below the main screen $a^1$ to give flashing illumination and also to carry a constant advertisement or legend.

Figures 3, 4, 5, 6:
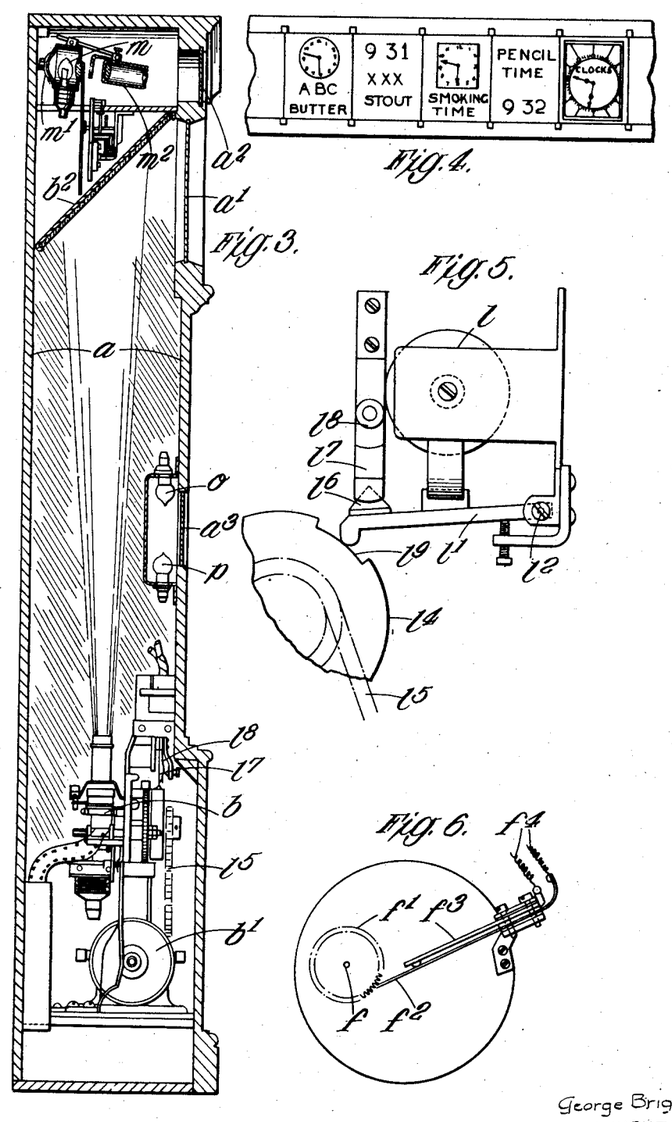
Figure 3 is a central vertical section on line 3—3 of Figure 1.
Figure 4 is a view showing a portion of the film used in the present invention.
Figure 5 is a fragmentary view showing the controlling mechanism for the electric motor which in this construction is employed to drive the projector.
Figure 6 is a view showing the manner in which the clock mechanism is employed to control the making and breaking of the electrical circuit.

The mechanism inside the casing comprises a projector $b$ of any suitable type, and driven by an electric motor, part of which is shown at $b^1$ (Figure 3). The projected beam from the projector $b$ is reflected at right angles (and, of course, vertically inverted) by an inclined mirror $b^2$ (Figure 3) and finally thrown on to the main screen $a^1$ to display the advertisement.

Figure 2:
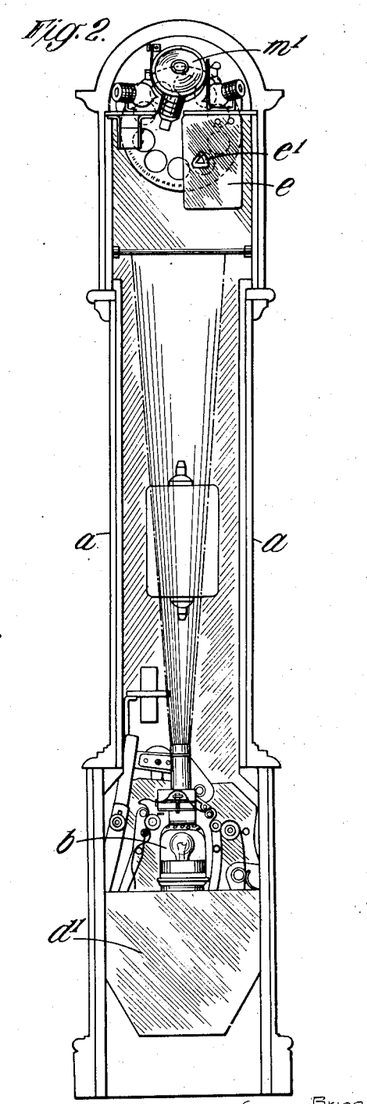
Figure 2 is a rear elevation of the device with the back cover removed in order to expose the mechanism.

The film $c$ for the projector is contained within a spool-box $d$ which is located just to the rear of the projector (see Figure 3), and is provided with a removable cover $d^1$ (Figure 2). It will be appreciated that since it is desired to display a different advertisement every half minute throughout a period of, say, twelve hours (the remaining period of twelve hours in each day being a repetition of the first period as regards time), it is necessary to have no less than 1440 different advertisement spaces. The film must, therefore, be in the form of an endless band so that it may run continuously. The length of film required, therefore, requires some special provision for the storage of the same. Any suitable device may be provided for this storage of the film, but the special device which I have devised and which is shown more particularly in Figure 8, is not only simple but also very efficient.

Figure 8:
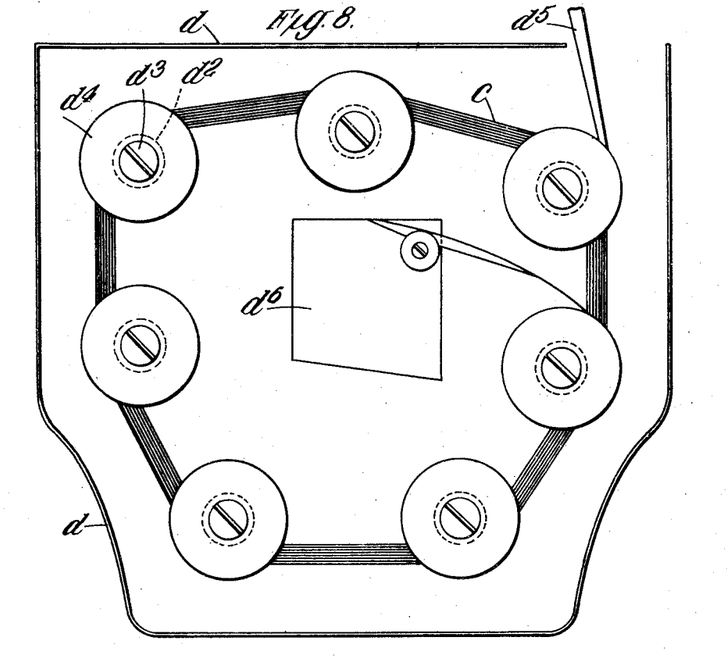
Figure 8 is a front elevation of the film spool-box with the cover removed.

The film spool-box $d$ is, as shown in Figure 8, provided with a plurality of rollers $d^2$ which are mounted on screws $d^3$ and have end flanges $d^4$. The film $c$ from the projector, after exhibition, enters the spool-box $d$ through an upper aperture $d^5$ and then winds itself around the outside of the spool of film $c$. From the spool-box the film is fed to the projector from the inside of the roll, as shown, through an aperture $d^6$. By this means a considerable amount of film may be wound within the spool-box; furthermore, the actual movement of the film is small—only one picture space every half minute—and, due to the free mounting of the rollers $d^2$, the whole roll of film moves round as a unit, the incoming film being wound around the outside of the roll, and the outgoing film being wound off the inside of the roll. There is thus very little, if any, surface friction between adjacent layers of the film, and the chance of the film becoming scratched is reduced to a minimum.

Turning now to the control mechanism, this comprises clock mechanism of any suitable type which is contained within a casing shown in rear elevation at $e$, Figure 2, $e^1$ being the winding handle. This clock mechanism is adapted to drive a spindle $f$ (Figure 6) to which is fixed a toothed wheel $f^1$. The spindle $f$ is driven at the rate of one complete revolution per minute and thus corresponds to the minute hand spindle of the clock mechanism. The toothed wheel $f^1$ thus advances one tooth per second, and, engaging with the teeth thereon, is one end of a blade spring contact $f^2$ suitably mounted on the clock mechanism casing, or in any other suitable position. The free end of the blade spring contact $f^2$ rides over the teeth and every time it rides over a tooth is adapted to break contact with a further contact $f^3$ in order to interrupt the electrical circuit between the wires $f^4$ which are connected to the blade spring contact $f^2$ and the contact $f^3$. The connection between the wires $f^4$ is thus completed once and broken once every second, since, when the blade spring $f^2$ falls between two teeth, the connection between the wires $f^4$ is made.

Figure 7:
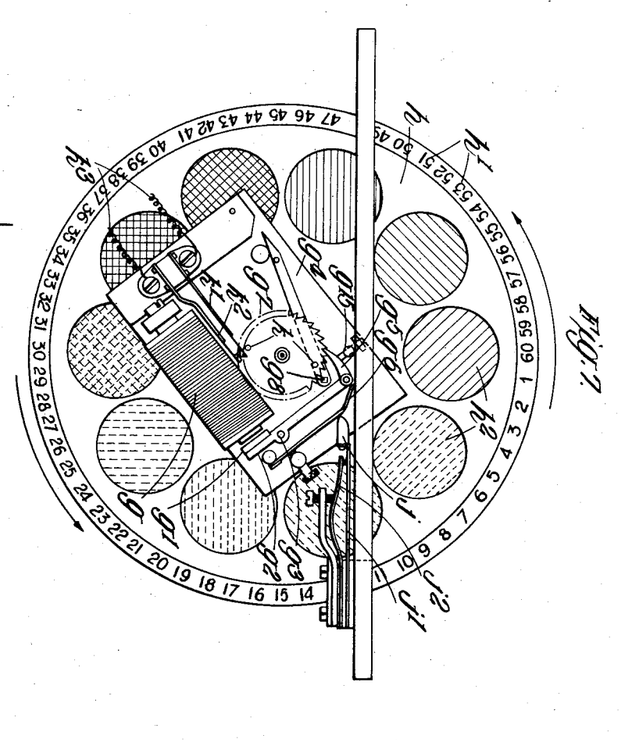
Figure 7 is a rear elevation of part of the upper portion of the mechanism shown in Figure 2, this mechanism being that for giving the seconds-indication and also for completing the electric circuit to the motor control mechanism shown in Figure 5.

The wires $f^4$ lead through a suitable source of current supply to the mechanism shown in Figure 7 where they are connected to a solenoid or electro-magnet $g$. The armature $g^1$ of this electro-magnet $g$ is secured to one arm of a lever $g^2$ which is pivoted at $g^3$ on a suitable mounting plate $g^4$. Pivoted at the free end of the lever $g^2$ is a pawl $g^5$ controlled by a spring $g^6$. This pawl $g^5$ engages with a ratchet wheel $g^7$ to comprise a step by step impulse mechanism, and overthrow is prevented by the adjustable screw $g^8$. $g^9$ is the usual stop engaging with the ratchet teeth to prevent back-throw. The ratchet wheel $g^7$ is provided with sixty teeth, and it will be appreciated that since the electro-magnet is energized once every second from the contacts $f^2$, $f^3$ (Figure 6), the ratchet wheel $g^1$ will be turned through a complete revolution in a minute. Secured to the spindle of the ratchet wheel $g^7$ is a disc $h$ having cut near its periphery a ring or numbers $h^1$ from 1 to 60, corresponding to the seconds, and since the disc $h$ has imparted to it one sixtieth of a revolution each second, the numbers at the top of the disc (or at any other part) will change every second and will indicate the passage of the seconds. This movement of the disc $h$ is utilized as hereinafter explained. The disc $h$ is also provided with a plurality of windows $h^2$ covered with variously coloured gelatine or the like. The purpose of these coloured windows will be explained hereinafter.

Engaging with the back of the spring $g^6$ is a nose $j$ carried by a blade spring contact $j^1$ which is adapted to co-operate with another blade spring contact $j^2$ in such a manner that, as the spring $g^6$ moves forward at the end of the attraction of the armature $g^1$ by the electro-magnet $g$, the contact $j^1$ is allowed to come into contact with the contact $j^2$, in order to complete the circuit between the same. When the armature $g^1$ is attracted by the electro-magnet (which is only for a short space of time), the pressure of the spring against the nose $j$ separates the contacts $j^1$ and $j^2$, and it will be seen it is only during that period of time that the ratchet wheel $g^7$ is at rest that the contact between $j^1$ and $j^2$ is completed. These contacts $j^1$ and $j^2$ are the "seconds flashing contacts" and will be so referred to hereinafter.

Carried by the ratchet wheel $g^7$ are two outstanding pins $k$ arranged diametrically opposite one another. These pins $k$ are adapted to operate on contacts $k^1$ and $k^2$ so as to complete the circuit between the wires $k^3$ for a short space of time, (say, one second). It is, however, obvious that since the pins $k$ are arranged diametrically opposite one another, and since the ratchet wheel $g^7$ rotates once a minute, that the contacts $k^1$ and $k^2$ will only be closed every half minute. These contacts, hereinafter termed the "motor control contacts" are used to control the motor in the following manner: The wires $k^3$ lead, through a suitable source of current, to an electromagnet or relay $l$ (Figure 5), the armature $l^1$ of which is pivoted at $l^2$. The nose $l^3$ of this armature $l^1$ bears on a gapped wheel, part of which is shown at $l^4$ (Figure 5). This wheel $l^4$ is geared to the projector motor $b^1$ by means of a chain or the like $l^5$. Carried by the upper face of the armature $l^1$ is a cone-shaped member $l^6$ so arranged that, when the armature $l^1$ is attracted by the electro-magnet $l$, the cone-shaped member $l^6$ is brought into contact with a contact $l^7$ in order to complete the circuit between the same and a contact $l^8$. The contacts $l^7$ and $l^8$ are included in the motor supply circuit, and it will thus be seen that whenever the armature $l^1$ is attracted—as it is every half minute by reason of the closing of the motor control contacts $k^1$, $k^2$—the motor is operated. The gap $l^9$ in the wheel $l^4$ is normally arranged under the nose of the armature $l^1$ which, due to its weight, falls into the gap and thus breaks the motor circuit. When, however, the electro-magnet $l$ is energized, the nose of the armature is lifted out of the gap $l^9$, and since the motor $b^1$ starts up, by the time the armature $l^1$ is released, the gap $l^9$ has moved clear of the nose of the armature. The nose of the armature thus rests on the edge of the wheel $l^4$ and this is arranged to be such that the motor circuit is still completed as the armature has not fallen sufficiently to open the contacts $l^7$, $l^8$. The motor circuit is thus maintained complete until such time as the gap $l^9$ again comes below the nose of the armature $l^1$, when the armature $l^1$ will fall and break the connection between $l^7$ and $l^8$. The motor circuit is thus broken after the wheel $l^4$ has completed one revolution. The drive to the projector $b$ is so adjusted that one revolution of the wheel $l^4$ corresponds to the feeding of the film forward a distance equal to one picture space. Thus, at every half minute, the picture in the gate of the projector is changed and consequently, as above explained, the advertisement shown on the screen $a^1$ will be altered.

It is one of the essential features of the present invention that the desired advertiseing matter and an indication of the correct time are contained within the film space which is within the gate. Figure 4 shows the advertisements and a time indication in a few picture spaces, according to the present invention. The advertising matter may be of the type and form required and so also may the time indication. Thus the time indication may be in the form of a clock or watch, the hands of which show the correct time, or the time indication may be by way of figures or words. Obviously the advertisement and the time indication may be combined in a very large number of ways, all of which come within the scope of the present invention which merely requires that the advertising matter and the time indication shall be contained within the same picture space so that only a single projector shall be required to show the advertisement and the time. No clock face is required, according to the present invention, from which the image may be projected, and if a representation of a clock or watch is used according to the present invention to show the time, the shape and pattern of the clock may vary from picture to picture, the only thing being that the hands of the clock are, in successive pictures, advanced half a minute since the picture is changed every half minute.

Thus by means of the present invention an advertisement and an indication of the correct time is always shown on the screen $a^1$, the advertising matter and the time preferably being co-related.

In addition to this very desirable and useful feature, the embodiment of this invention shown in the drawings is also adapted to show passage of the seconds. This is carried out in the following manner:—As above described, the disc $h$, which has stencilled around its periphery numbers from 1 to 60, is advanced one step every second and the stencilled figure appearing at the top of the disc $h$ is projected on to the centre of the upper screen $a^2$ by means of the bulb $m$ arranged within a casing $m^1$ (Figure 3). The bulb $m$ thus passes light through the upper-most figure, and an image of the stencil is sharply focussed on to the screen $a^2$ by the projection lens $m^2$. The bulb $m$ is wired in series with the seconds flashing contacts $j^1$, $j^2$ so that the lamp flashes on every second. Thus every second the number appearing on the screen $a^2$ is advanced one unit and so the seconds appear one after the other in the desired sequence and correct time on the screen $a^2$.

In addition to this flashing of seconds one after the other on to the screen $a^2$, the present invention also provides for the flooding of the remaining portion of the screen $a^2$ with differently coloured lights. Each half of the screen $a^2$ may be flooded with differently coloured lights and this may be obtained by means of bulbs $n$ (Figure 2) arranged one on each side of the casing $m^1$, these bulbs $n$ shining through the coloured windows $h^2$ on to the screen $a^2$. The windows $h^2$ being covered with coloured gelatine and the disc $h$ revolving step by step, various coloured illuminations will be obtained which will materially add to the attractiveness of the device. The bulbs $n$ are also wired in series with the seconds flashing contacts $j^1$, $j^2$ so as to illuminate the screen $a^2$ at the desired intervals.

In addition, a further bulb $o$ may be arranged behind the window $a^3$ in the casing, together with a bulb $p$, the bulb $o$ being wired in series with the seconds flashing contacts, and the bulb $p$ in series with the motor control contacts so that the bulb $o$ flashed every second and the bulb $p$ every half minute.

Figure 9:
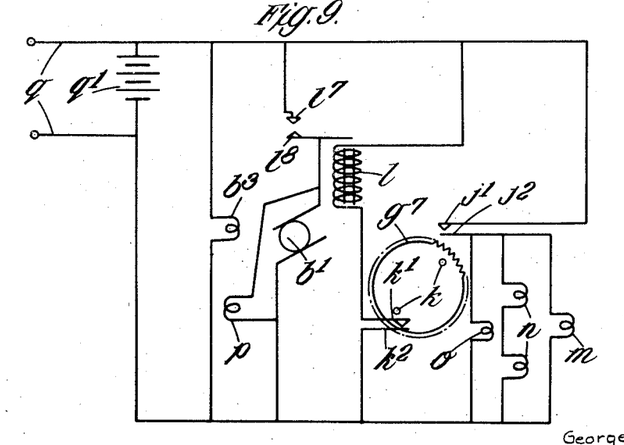
Figure 9 is a simplified wiring diagram of the apparatus.

Figure 9 shows a simplified circuit diagram by means of which the various operations will be easily followed, like reference letters being used for like parts to facilitate reference. In Figure 9, however, the supply has been shown as being drawn from a common supply $q$, with a float battery $q^1$ across the same. This is not, of course, essential as the supply may be taken from the mains or from batteries alone and, if desired, the mains may be employed to drive one part of the apparatus, say, the motor, and batteries may be employed to supply the lamps. $b^3$ in Figure 9 is the projector lamp.

Many modifications may be made in the above described form without departing from the spirit of the present invention, thus, for example, the clockwork mechanism $e$ may be replaced by any other suitable mechanism which is adapted to give electrical impulses every second, or, if the seconds indication is to be omitted, as it may in certain constructions be, to give electrical impulses every half minute. Any other type or shape of casing may be employed to house the apparatus, and in some cases the screen or screens, as the case may be, may be separate from the remainder of the apparatus, and advertisements and time indications being projected on to the same in any suitable manner. Again, a number of devices, according to the present invention, may be used together and fed from a common impulse supply circuit which is controlled by a single clock mechanism or the like.

Figure 10:
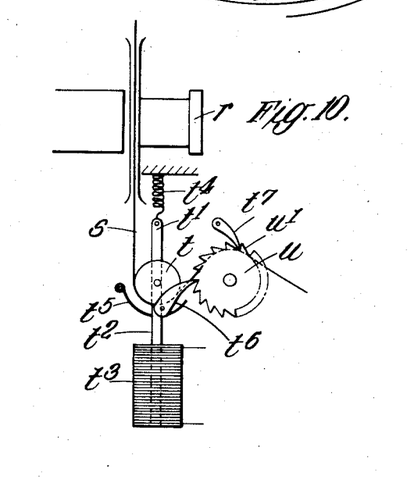
Figure 10 is a diagrammatic view showing a modified method of controlling the film mechanism.

The film feeding mechanism may be modified as desired and, in this connection, more particularly the motor operation described above, may be replaced by the solenoid or electro-magnet operation illustrated in Figure 10 of the accompanying drawings.

In Figure 10 $r$ is part of the projector and $s$ is the film. After passing through the gate of the projector $r$, the film $s$ passes under a roller $t$ and then over the lower feeding sprocket $u$ which is provided with a ratchet $u^1$. The roller $t$ is carried by a rod $t^1$ which forms part of, or is connected to the armature $t^2$ of the solenoid $t^3$. $t^4$ is a tension spring which tends normally to raise the armature $t^2$ against the pull of the solenoid $t^3$. The solenoid is wired to the contacts $l^7$ and $l^8$ or $k^1$ and $k^2$ so that it is energized every half minute. When the solenoid $t^3$ is energized, the roller $t$ is pulled down and in so doing pulls the film toward one picture space; $t^5$ is a stop to limit the downward movement of the roller $t$. Pivoted on the rod $t^1$ is a pawl $t^6$ engaging with the ratchet $u^1$ so that when the current to the solenoid is cut off and the rod $t^1$ rises under the action of the spring $t^4$, the ratchet $u^1$ is advanced one step to take up the length of film which has been pulled down by the movement of the roller $t$. $t^7$ is a back stop click to prevent back-throw. By this simple means, therefore, the film is fed forward one picture space every time the solenoid is operated, i. e. every half minute.

Various other fittings may be provided, such as a time switch to cut out the illumination during certain hours, a switch for closing the motor or solenoid circuit, in order to set the device in accordance with the correct time.

Although it is preferred to change the advertisement and the time indication every half minute, it will be obvious that the periods during which the individual advertisements are displayed may be altered. Also the time indication need not be provided on all of the advertisements.

In place of the seconds flashing, above described, the same result may be obtained by means of a ring of 60 small bulbs surrounding the main screen $a^1$. A control is then provided to light up a new bulb each second, while at the same time preferably maintaining alight those bulbs which have already been lit up. Thus at the first second after the minute, one bulb would be alight, at the second second two bulbs would be alight, at the third second three bulbs and so on.

The present invention is not limited to the use of films for carrying the advertisements or the like, and the time indication, as several other media may be used. Thus, for example, I may, in place of the film, employ slides, each of which, as in the case of the film above described, carries an advertisement or the like and a time indication. The slides are then fed to a projector one by one, say, every two minutes and a feeding arm or the like is controlled from clockwork mechanism in such a manner as to remove that slide which has been exhibited and to substitute a new slide in the projector every two minutes or at any other predetermined interval of time. The slides may be carried within the apparatus on an endless runway and be arranged to approach the feeding mechanism under the action of gravity.

In another form of the present invention, the advertisements, legends or the like and the time indications may be carried by a nontranslucent band, the movement of which is controlled by clockwork mechanism, as above described. In this case, an image of the space on the band is projected on to a screen by a suitable projector.

In a still further form of the present invention, the band itself, carrying in each space the advertisement or the like and the time indication, may be shown in the apparatus in which case the movement of the band would be controlled from suitable clockwork mechanism, preferably in the manner described above.

Again, in yet a further form, the advertisements and time indication may be carried by a stencil which is intermittently moved in accordance with the time across electrical contacts, in order to cause the advertisements and time indication to be flashed on a screen carrying a plurality of lamps.

I claim:—

1. An advertising device comprising a screen, a film, the picture spaces of which bear, in addition to advertising matter, a time indication, a projector to project an image of the film spaces on said film on to said screen, clock-work mechanism and means whereby said clock-work mechanism is adapted to actuate the projector mechanism to advance the film one picture space at each predetermined interval of time.

2. An advertising device comprising a screen, an endless film, the picture spaces of which bear, in addition to advertising matter, a time indication, a projector to project an image of the film spaces on said film on to said screen, clock-work mechanism and means whereby said clock-work mechanism is adapted to actuate the projector mechanism to advance the film one picture space at each predetermined interval of time.

3. An advertising device comprising a screen, an endless film having thereon 1,440 picture spaces, each of which bears, in addition to advertising matter, a time indication, a projector to project an image of the film spaces on said film on to said screen, clock-work mechanism and means whereby said clock-work mechanism is adapted to actuate the projector mechanism every half minute to advance the film one picture space at each actuation.

4. An advertising device comprising a screen, a film, the picture spaces of which bear, in addition to advertising matter, a time indication, a projector to project an image of the film spaces on said film on to said screen, clock-work mechanism, means whereby said clock-work mechanism is adapted to actuate the projector mechanism to advance the film one picture space at each predetermined interval of time, an auxiliary screen, a disc having cut out near its periphery a sequence of sixty numbers, means for rotating said disc by sixty intermittent steps each minute from said clock-work mechanism, said sixty steps comprising a complete revolution of the disc and means for projecting an image of one of the figures cut out from said disc on to said auxiliary screen.

5. An advertising device comprising a screen, a film, the picture spaces of which bear, in addition to advertising matter, a time indication, a projector to project an image of the film spaces on said film on to said screen, clock-work mechanism, means whereby said clock-work mechanism is adapted to actuate the projector mechanism to advance the film one picture space at each predetermined interval of time, an auxiliary screen, a spindle, a disc secured to said spindle having cut out near its periphery a sequence of sixty numbers, a ratchet wheel secured to said spindle, a pawl adapted to engage said ratchet wheel and advance the same step by step, an electro-magnet to cause movement of said pawl to advance the ratchet wheel, a pair of contacts in the circuit of said electro-magnet, a seconds arbor to said clock-work mechanism and a toothed wheel on said seconds arbor adapted to engage with said contacts to make and break the same once each second to cause operation of said disc.

6. An advertising device comprising a screen, a film, the picture spaces of which bear, in addition to advertising matter, a time indication, a projector to project an image of the film spaces on said film on to said screen, an electric motor to drive said projector, a pair of contacts in the circuit of said motor, clock-work mechanism, a seconds arbor to said clock-work mechanism rotating once a minute, a disc on said seconds arbor, two diametrically opposite pins on said disc adapted to engage said motor circuit contacts to close the motor circuit and so cause operation of the projector once every half minute to advance the film one picture space, and means for breaking the motor circuit after the projector has operated to advance the film one picture space.

7. An advertising device comprising a screen, a film, the picture spaces of which bear, in addition to advertising matter, a time indication, a projector to project an image of the film spaces on said film on to said screen, an electric motor to drive said projector, a relay, the contacts of which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit and hence, by means of the relay contacts, the motor circuit to cause operation of the projector once every half minute to advance the film one picture space, and means for breaking the motor circuit after the projector has operated to advance the film one picture space.

8. An advertising device comprising a screen, a film, the picture spaces of which bear, in addition to advertising matter, a time indication, a projector to project an image of the film spaces on said film on to said screen, an electric motor to drive said projector, a relay comprising an electro-magnet and an armature which by its movement is adapted to close and open the relay contacts which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit, and hence, by means of the relay contacts, the motor circuit to cause operation of the projector once every half minute, a disc driven by the projector motor having a gap in its periphery, said disc being located under the armature of the relay, a nose to said armature adapted to engage in said gap, the arrangement being such that when said relay is operated to cause attraction of the armature the nose is lifted out of the gap and by reason of its bearing on the ungapped edge of the disc prevents said armature falling, even after the relay circuit is broken, to break the motor circuit until such time as the gap again becomes located under the nose by which time the motor has caused the projector to advance the film one picture space.

9. An advertising device comprising a screen, a film, the picture spaces of which bear, in addition to advertising matter, a time indication, a projector to project an image of the film spaces on said film on to said screen, an electric motor to drive said projector, a relay, the contacts of which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit and hence, by means of the relay contacts, the motor circuit to cause operation of the projector once every half minute to advance the film one picture space, means for breaking the motor circuit after the projector has operated to advance the film one picture space, an auxiliary screen, a disc having cut out near its periphery a sequence of sixty numbers, means for rotating said disc by sixty intermittent steps each minute from said clock-work mechanism, said sixty steps comprising a complete revolution of the disc and means for projecting an image of one of the figures cut out from said disc on to said auxiliary screen.

10. An advertising device comprising a screen, a film, the picture spaces of which bear, in addition to advertising matter, a time indication, a projector to project an image of the film spaces on said film on to said screen, an electric motor to drive said projector, a relay, the contacts of which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit and hence, by means of the relay contacts, the motor circuit to cause operation of the projector once every half minute to advance the film one picture space, means for breaking the motor circuit after the projector has operated to advance the film one picture space, a spindle, a disc secured to said spindle having cut out near its periphery a sequence of sixty numbers, a ratchet wheel secured to said spindle, a pawl adapted to engage said ratchet wheel and advance the same step by step, an electro-magnet to cause movement of said pawl to advance the ratchet wheel, a pair of contacts in the circuit of said electro-magnet, a seconds arbor to said clock-work mechanism and a toothed wheel on said seconds arbor adapted to engage with said contacts to make and break the same once each second to cause operation of said disc.

11. An advertising device comprising a screen, a film, the picture spaces of which bear, in addition to advertising matter, a time indication, a projector to project an image of the film spaces on said film on to said screen, an electric motor to drive said projector, a relay comprising an electro-magnet and an armature which by its movement is adapted to close and open the relay contacts which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit, and hence, by means of the relay contacts, the motor circuit to cause operation of the projector once every half minute, a disc driven by the projector motor having a gap in its periphery, said disc being located under the armature of the relay, a nose to said armature adapted to engage in said gap, the arrangement being such that when said relay is operated to cause attraction of the armature the nose is lifted out of the gap and by reason of its bearing on the ungapped edge of the disc prevents said armature falling, even after the relay circuit is broken, to break the motor circuit until such time as the gap again becomes located under the nose by which time the motor has caused the projector to advance the film one picture space, an auxiliary screen, a disc having cut out near its periphery a sequence of sixty numbers, means for rotating said disc by sixty intermittent steps each minute from said clock-work mechanism, said sixty steps comprising a complete revolution of the disc and means for projecting an image of one of the figures cut out from said disc on to said auxiliary screen.

12. An advertising device comprising a screen, a film, the picture spaces of which bear, in addition to advertising matter, a time indication, a projector to project an image of the film spaces on said film on to said screen, an electric motor to drive said projector, a relay comprising an electro-magnet and an armature which by its movement is adapted to close and open the relay contacts which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit, and hence, by means of the relay contacts, the motor circuit to cause operation of the projector once every half minute, a disc driven by the projector motor having a gap in its periphery, said disc being located under the armature of the relay, a nose to said armature adapted to engage in said gap, the arrangement being such that when said relay is operated to cause attraction of the armature the nose is lifted out of the gap and by reason of its bearing on the ungapped edge of the disc prevents said armature falling, even after the relay circuit is broken, to break the motor circuit until such time as the gap again becomes located under the nose by which time the motor has caused the projector to advance the film one picture space, a spindle, a disc secured to said spindle having cut out near its periphery a sequence of sixty numbers, a ratchet wheel secured to said spindle, a pawl adapted to engage said ratchet wheel and advance the same step by step, an electro-magnet to cause movement of said pawl to advance the ratchet wheel, a pair of contacts in the circuit of said electro-magnet, a seconds arbor to said clock-work mechanism and a toothed wheel on said seconds arbor adapted to engage with said contacts to make and break the same once each second to cause operation of said disc.

13. An advertising device comprising a screen, a film, the picture spaces of which bear, in addition to advertising matter, a time indication, a projector to project an image of the film spaces on said film on to said screen, a solenoid, a core to said solenoid, a roller on said core engaging with said film, a relay, the contacts of which are included in the solenoid circuit, a pair of contacts in said relay circuit, clock-work mechanism, a seconds arbor to said clock-work mechanism rotating once a minute, a disc secured to said seconds arbor, two diametrically opposite pins on said disc adapted to engage said relay circuit contacts to close the relay circuit and hence, by means of the relay contacts, the solenoid circuit to cause the core to be attracted and so advance the film one picture space.

14. An advertising device comprising a screen, an endless film, the picture spaces of which bear, in addition to advertising matter, a time indication, a case for said endless film, rollers in said case about which the film is arranged, one loop passing out of said casing, a projector through which said loop passes to project an image of the film spaces on said film on to said screen, clock-work mechanism and means whereby said clock-work mechanism is adapted to actuate the projector mechanism to advance the film one picture space at each predetermined interval of time.

15. An advertising device comprising a screen, an endless film having thereon 1,440 picture spaces, each of which bear, in addition to advertising matter, a time indication, a case for said endless film, rollers in said case about which the film is arranged, one loop passing out of said casing, a projector to project an image of the film spaces on said film on to said screen, clock-work mechanism and means whereby said clock-work mechanism is adapted to actuate the projector mechanism every half minute to advance the film one picture space at each actuation.

16. An advertising device comprising a screen, a film, the picture spaces of which bear, in addition to advertising matter, a time indication, a case for said endless film, rollers in said case about which the film is arranged, one loop passing out of said casing, a projector to project an image of the film spaces on said film on to said screen, clock-work mechanism, means whereby said clock-work mechanism is adapted to actuate the projector mechanism to advance the film one picture space at each predetermined interval of time, an auxiliary screen, a disc having cut out near its periphery a sequence of sixty numbers, means for rotating said disc by sixty intermittent steps each minute from said clock-work mechanism, said sixty steps comprising a complete revolution of the disc and means for projecting an image of one of the figures cut out from said disc on to said auxiliary screen.

17. An advertising device comprising a screen, a film, the picture spaces of which bear, in addition to advertising matter, a time indication, a case for said endless film, rollers in said case about which the film is arranged, one loop passing out of said casing, a projector to project an image of the film spaces on said film on to said screen, clock-work mechanism, means whereby said clock-work mechanism is adapted to actuate the projector mechanism to advance the film one picture space at each predetermined interval of time, an auxiliary screen, a spindle, a disc secured to said spindle having cut out near its periphery a sequence of sixty numbers, a ratchet wheel secured to said spindle, a pawl adapted to engage said ratchet wheel and advance the same step by step, an electro-magnet to cause movement of said pawl to advance the ratchet wheel, a pair of contacts in the circuit of said electro-magnet, a seconds arbor to said clock-work mechanism and a toothed wheel on said seconds arbor adapted to engage with said contacts to make and break the same once each second to cause operation of said disc.

18. An advertising device comprising a screen, a film, the picture spaces of which bear, in addition to advertising matter, a time indication, a case for said endless film, rollers in said case about which the film is arranged, one loop passing out of said casing, a projector to project an image of the film spaces on said film on to said screen, an electric motor to drive said projector, a pair of contacts in the circuit of said motor, clock-work mechanism, a seconds arbor to said clock-work mechanism, rotating once a minute, a disc on said seconds arbor, two diametrically opposite pins on said disc adapted to engage said motor circuit contacts to close the motor circuit and so cause operation of the projector once every half minute to advance the film one picture space, and means for breaking the motor circuit after the projector has operated to advance the film one picture space.

19. An advertising device comprising a screen, a film, the picture spaces of which bear, in addition to advertising matter, a time indication, a case for said endless film, rollers in said case about which the film is arranged, one loop passing out of said casing, a projector to project an image of the film spaces on said film on to said screen, an electric motor to drive said projector, a relay comprising an electro-magnet and an armature which by its movement is adapted to close and open the relay contacts which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit, and hence, by means of the relay contacts, the motor circuit to cause operation of the projector once every half minute, a disc driven by the projector motor having a gap in its periphery, said disc being located under the armature of the relay, a nose to said armature adapted to engage in said gap, the arrangement being such that when said relay is operated to cause attraction of the armature the nose is lifted out of the gap and by reason of its bearing on the ungapped edge of the disc prevents said armature falling, even after the relay circuit is broken, to break the motor circuit until such time as the gap again becomes located under the nose by which time the motor has caused the projector to advance the film one picture space.

20. An advertising device comprising a screen, a film, the picture spaces of which bear, in addition to advertising matter, a time indication, a case for said endless film, rollers in said case about which the film is arranged, one loop passing out of said casing, a projector to project an image of the film spaces on said film on to said screen, an electric motor to drive said projector, a relay comprising an electro-magnet and an armature which by its movement is adapted to close and open the relay contacts which are included in the motor circuit, a pair of contacts in said relay circuit, clock-work mechanism, a seconds arbor to said clock-work mechanism rotating once a minute, a disc on said seconds arbor, two diametrically opposite pins on said disc adapted to engage said relay circuit contacts to close the relay circuit, and hence, by means of the relay contacts, the motor circuit to cause operation of the projector once every half minute, a disc driven by the projector motor having a gap in its periphery, said disc being located under the armature of the relay, a nose to said armature adapted to engage in said gap, the arrangement being such that when said relay is operated to cause attraction of the armature the nose is lifted out of the gap and by reason of its bearing on the ungapped edge of the disc prevents said armature falling, even after the relay circuit is broken, to break the motor circuit until such time as the gap again becomes located under the nose by which time the motor has caused the projector to advance the film one picture space, a spindle, a disc secured to said spindle having cut out near its periphery a sequence of sixty numbers, a ratchet wheel secured to said spindle, a pawl adapted to engage said ratchet wheel, and advance the same step by step, an electro-magnet to cause movement of said pawl to advance the ratchet wheel, a pair of contacts in the circuit of said electro-magnet, a seconds arbor to said clock-work mechanism and a toothed wheel on said seconds arbor adapted to engage with said contacts to make and break the same once each second to cause operation of said disc.

In testimony whereof I have signed my name to this specification.

GEORGE BRIGGS.